United States Patent Office 2,707,857
Patented May 10, 1955

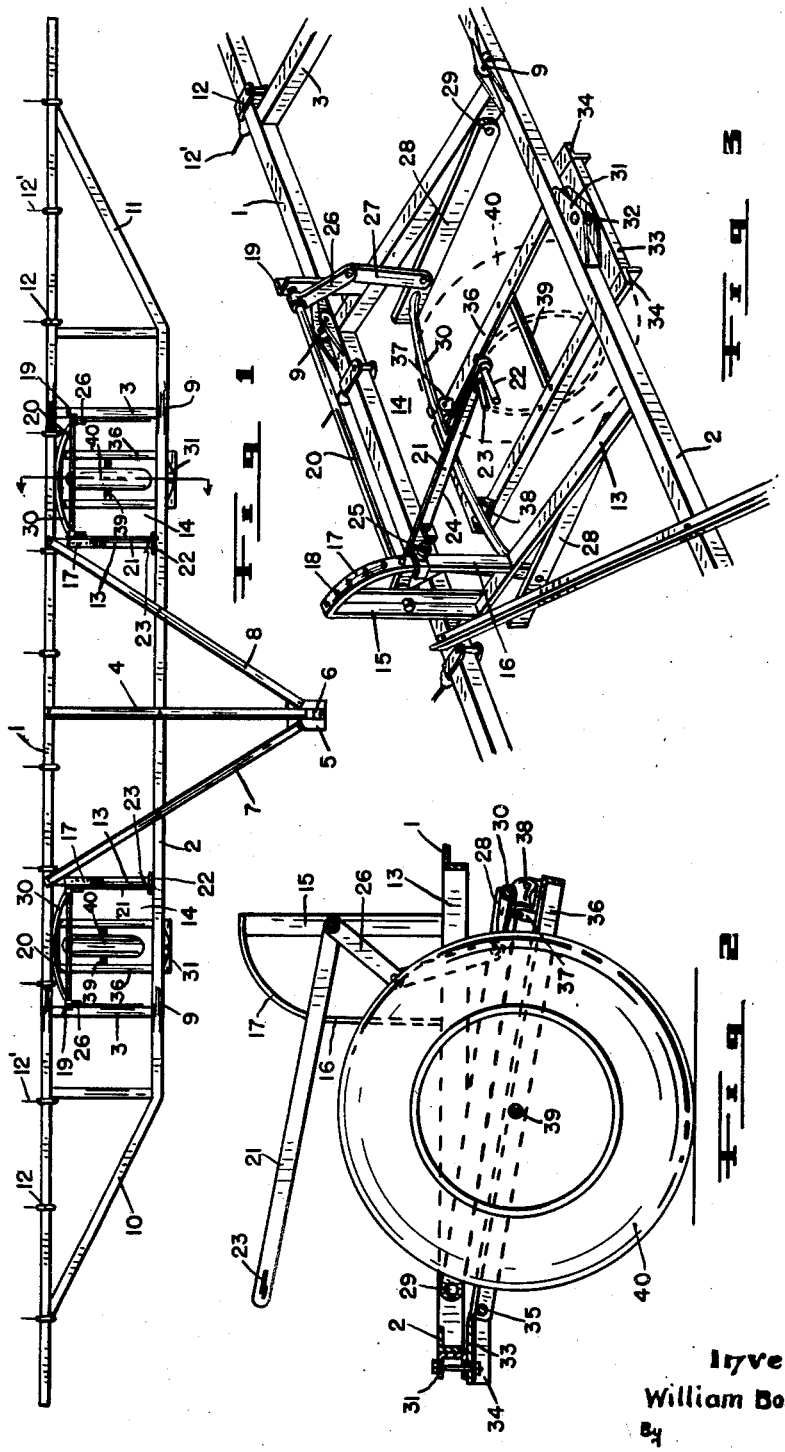

2,707,857

ELEVATABLE CASTER SUPPORT FOR HARROW CARRIAGES

William Bobrowski, Morris, Manitoba, Canada

Application May 9, 1952, Serial No. 286,983

2 Claims. (Cl. 55—93)

Modern methods of power farming have been built around the adaptability of the tractor to the operation of every type of farm implement. Due to the concentration of power embodied in these machines, its ready application, especially for haulage, has resulted in multiple implement coverage of great tracts of land, with little manual attention to the implements and low cost per acre.

The above is particularly true for harrowing operations, and by the use of a tractor, multiple series of harrow units can be hauled over the land for quick and efficient pulverization of the soil. As these harrow units are free floating, while being drawn, and extend over a considerable area, harrow carriages have been developed to hold them on their course in spaced relation, while providing a central draft point for connection to the tractor.

A well known type of harrow carriage consists of a long transverse wheel supported frame which is held at a fixed elevation. The rear beam is provided with suitable connections to the harrow units and the front centrally carries a draft hitch for connection to a tractor draw bar. Due to the fact that the elevation of the carriage is fixed, the rear connections back to the harrow units are not always at a suitable angle for the proper working of the harrows under the conditions encountered, and therefor perfect pulverization, normally expected, is not attained, while it is too low for satisfactory transportation from field to field or along highways. It has also been found that, due to the sinking of the ground wheels in the soft soil, the side draft in turning and skidding requires excessive hauling power from the tractor.

The principal object of the present invention is to design a harrow carriage, such as above described, and wherein such carriages may be adjustably raised or lowered on the wheels to provide correct draft from the carriage to the harrow units for all soil conditions, while it also can be raised sufficiently to clear interfering material when road transported.

A further object of the invention is to design said wheel support such, that a caster effect is provided to assist in the turning movement of the carriage and so prevent excessive wear on bearings, eliminate skidding and permit free rotation of the wheels.

A further object of the invention is to obtain the above advantages independently at either end of the carriage.

Further objects of the invention are, to accomplish the above in an efficient manner, without changing the size, general design or operation of the harrow carriage, with few moving parts and friction reduced to a minimum, sturdy, to stand up under hard usage, and simple and economical to manufacture so that the complete harrow carriage can be placed on the market at a reasonable price.

With the above important and other minor objects in view, which will become more apparent as the description proceeds, the invention consists essentially in the construction, arrangement and assembly of the various parts hereinafter more particularly described, reference being had to the accompanying drawings in which:

Figure 1 is a plan view of the harrow carriage with the invention embodied therein at each end, and showing the connections for the harrow units.

Figure 2 is an enlarged cross sectional view taken on the dot and dash line 2—2, Figure 1.

Figure 3 is a perspective view showing the construction of one of the wheel supports for the carriage and with the wheel itself indicated in dotted outline.

In the drawings like characters of reference indicate corresponding parts in the several figures.

The central harrow carriage generally is a rectangular-shaped angle iron frame presenting a rear draft bar 1, a front angle iron cross bar 2, both being spaced apart and connected at each end by short angles 3. A central angle iron 4 extends from the draft bar 1, across the cross bar 2, to a position ahead where it is secured to a draft plate 5 which carries a clevis 6 thereon for connection to a tractor draw bar (not shown). A pair of reinforcing angles 7 and 8 extend angularly from the draft plate, back over the front cross bar and to the draft bar, to present a rigid reinforcing truss to the central frame.

Each corner of the central frame is provided with hinges 9 to pivotally receive end triangular-shaped frames 10 and 11 which form extensions to the original central frame, including extensions to the draft bar 1. The draft bar, including the extensions, are provided at spaced intervals with clamp members 12, having rods 12' extending rearwardly therefrom for draft connection to rear harrow units (not shown).

From the above description it will be observed that the triangular extension frames 10 and 11 can be swung on the hinges 9, up and over onto the main frame to form a relatively compact narrower vehicle when it is to be road transported. The above is a general description of the harrow carriage frames, and when provided with wheels at each end, would be a complete carriage as at present used.

The present invention is more specifically confined to the wheel supports for the above carriage and one support will now be described.

At each side of the centre trussed frame, and approximately at the position where the reinforcing bars 7 and 8 join the draft bar 1, an angle iron 13 connects the draft bar with the cross angle 2, so as to form, with the angle 3, a rectangular-shaped opening 14. The rear part of the angle 13 supports a vertical angled standard 15 while a second standard 16 is slightly in advance thereof with the upper end curved back to the angle 15 to form a quadrant 17. Spaced holes 18 are provided through the face of the quadrant. An angle iron standard 19 projects upwardly from the horizontal angle 3, approximately opposite the angle 16 and a cross shaft 20 is rotatably mounted in these two angles and controlled by a lever 21 which swings around the quadrant 17. The lever 21 is provided with a handle 22 and an adjacent finger control 23 which, through a wire 24, operates a spring loaded detent, indicated at 25, which is adapted to enter the holes 18 for adjusted positions of the lever. Each end of the shaft 20 is provided with a crank 26 which, through links 27, control the raising and lowering of arms 28, the front ends of which are pivotally mounted at 29 on the sides of the angles 3 and 14. The link connecting ends of these arms are interconnected by a curved round rod 30, to form a bail-shaped unit member.

On the front of the cross angle 2, centrally of the angles 3 and 14, a U-shaped bracket 31 is mounted and forms a pivot point at 32 for a heavy plate 33 positioned therebelow. Each end of this plate is welded to a horizontal short angle 34. These latter angles extend rearwardly and pivotally receive at 35 the forked ends of a U-shaped angle sub framework 36, positioned in the opening 14. The rear part of this latter framework is provided at each corner with brackets 37 which carry concave rollers 38 which underlie and support the curved rod 30 of the arms 28. The U-shaped frame 36 is centrally provided with an axle 39 which rotatably receives a rubber tired ground wheel 40.

From the above construction it will be seen that the ground wheels, through the U-shaped frameworks 36 and connections, support the harrow carriage and the carriage can be raised or lowered by operation of the levers 21. When the draft clevis 6 is connected to a tractor (not shown) and the harrow units (not shown) are connected to the clamps 12, the height of the harrow carriage can be easily adjusted to the best draft position for the units according to the conditions of the soil, and each end of the machine can be adjusted separately and to different heights, if so desired. As the frameworks 36 are pivotally mounted on the front of the harrow carriage and can therefor swing, they provide a caster effect to the wheels so that the harrow carriage can turn corners with the rollers 38 swinging and riding the curved rod 30. In other words; the frameworks 36 turn the wheels in relation to the carriage and in the correct direction for free rotation of the wheels without side draft. Accordingly, less power is required from the tractor draw bar in making such turns and early worn bearings on the axles are avoided. When the harrow carriage is to be moved from one field to another or taken along a road, the extensions are swung up onto the centre frame while the complete carriage is lifted by the levers to its highest position and so clear all interferences. The mechanism of these wheel supports is simple, yet sturdy, and will last for a long period with hard usage and little attention.

What I claim as my invention is:

1. An elevatable caster support for a carriage, comprising: a main frame having an opening therein; a ground wheel; a rectangular-shaped sub-frame rotatably supported by said ground wheel; said sub-frame having one end thereof mounted on said main frame for vertical and side swinging movement of said sub-frame within said opening; anti-friction supporting means carried by the free swinging end of said sub-frame; a bail-shaped member pivotally mounted on said main frame for vertical movement and with the central swinging part thereof overlying and supported by said anti-friction means; a lever mounted on said main frame and operable over a quadrant; and linkage means between said lever and said bail-shaped member for raising or lowering said main frame on said ground wheel, in the operation of said lever.

2. In a harrow carriage having an elongated main frame with an opening adjacent each end thereof; an elevatable caster support therefor, comprising: a pair of ground wheels; a pair of sub-frames, each rotatably supported by one of said ground wheels and each positioned in one of said main frame openings; one end of each of said sub-frames mounted on said main frame for vertical and side swinging movement of said sub-frames thereon; a pair of bail-shaped members, pivotally mounted for vertical movement on said main frame and with the central swinging portion of each thereof overlying the free end of one of said sub-frames; anti-friction members between said sub frames and said bail-shaped members; a pair of levers mounted on said main frame, each adjacent one of said openings and operable over a quadrant; and each of said levers link connected with its adjacent bail-shaped member for individually raising or lowering its respective end of said main frame to selected positions on its respective ground wheel, when either one of said levers is operated.

References Cited in the file of this patent

UNITED STATES PATENTS

| 166,939 | Rider | Aug. 24, 1875 |
| 700,923 | Henderson | May 27, 1902 |
| 1,963,426 | Taylor | June 19, 1934 |

FOREIGN PATENTS

| 989,618 | France | May 23, 1951 |
| 360,505 | Italy | June 23, 1938 |